No. 878,182.

PATENTED FEB. 4, 1908.

C. C. BLAKE.
SOLDERING APPLIANCE.
APPLICATION FILED NOV. 22, 1906.

WITNESSES:
Joseph A. Gately
Frank C. Lockwood

INVENTOR.
Charles C. Blake
BY Geo. Willis Pierce
ATTORNEY.

UNITED STATES PATENT OFFICE.

CHARLES C. BLAKE, OF BROOKLINE, MASSACHUSETTS.

SOLDERING APPLIANCE.

No. 878,182. Specification of Letters Patent. Patented Feb. 4, 1908.

Application filed November 22, 1906. Serial No. 344,660.

*To all whom it may concern:*

Be it known that I, CHARLES C. BLAKE, residing at Brookline, in the county of Norfolk and State of Massachusetts, have invented certain Improvements in Soldering Appliances, of which the following is a specification.

The present invention relates to the art of soldering metals and to the utensils employed therein, and has especial reference to the construction of the flexible tube containing a soldering flux in the form of a fluid or paste, commonly used in connection with the soldering process. As is well known such tubes are made usually of thin metal of some soft alloy, and when the contents are desired the end of the tube is squeezed and the contained liquid or paste is squirted from its orifice. So far as I am aware such flexible tubes containing the liquid or pasty flux have an orifice for the exit of the same like that of a bottle.

My invention consists of a flexible tube having a spout or nozzle preferably detachable from the tube, and to prevent the burning or fusing of the same when placed near to or upon the seam or edge of the metal to be soldered, and adjacent to the hot soldering iron, I make the said spout of some metal which will not fuse or become clogged with the melted solder commonly used, and I preferably employ the metal aluminium. I also seal the mouth of the spout or nozzle when made as an article of manufacture with some easily fusible substance as rosin in order that the liquid or pasty flux will not escape. All of which I will now proceed to describe and point out in the appended claims.

Figure 1:
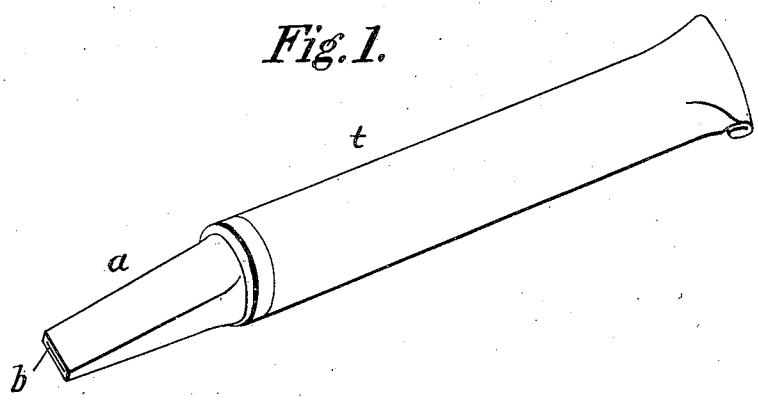
Figure 2:
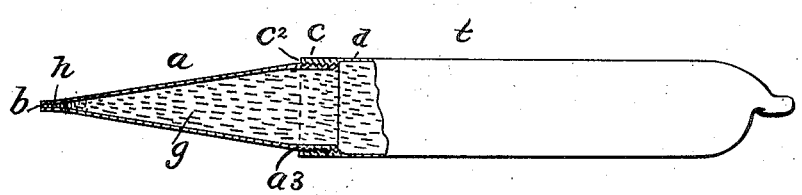

Of the drawings which illustrate the invention: Figure 1 is a perspective view of a flexible tube. Fig. 2 is a side view of a flexible tube partly in section, and Figs. 3 and 4 are side and end views of a modification.

Both of the forms are provided with a spout or nozzle adapted for use in connection with soldering appliances, embodying the invention.

Figure 3:
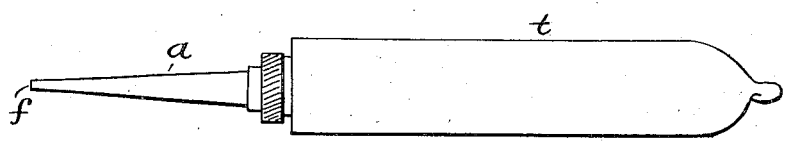
Figure 4:
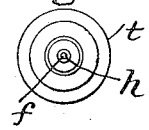

In the drawings $t$ represents a soft or flexible tube closed at one end and provided at its opposite end with a thickened portion or ring $c$ having an internal screw $c^2$; and $a$ is a spout or nozzle externally screw-threaded at one end $a^3$ which is adapted to fit into the ring $c$ while its opposite may be flattened, as represented in Fig. 1, and have a slitted orifice $e$, or the end may be conical as shown in Figs. 3 and 4, and have a circular orifice $f$. In either case the walls of the spout are made thick enough to withstand the usage necessary without bending the same. If such tubes as described were provided with spouts made of tinned iron or similar metals and brought into contact with melted solder their orifices $e$ and $f$ would be closed by the same, as the solder, would adhere thereto. To prevent this trouble I make the spout or nozzle of some metal to which melted solder of the ordinary kind will not adhere, such as aluminium, which is well known cannot be soldered with the fluxes and solders in common use. I therefore provide a spout or nozzle which can be used with perfect impunity in connection with the melted solder employed to attach other metals than aluminium to one another. The tube is filled with the ordinary paste or flux $g$, which is apt to run out from the orifice of the spout unless means are provided to prevent the same, commonly a piece of wire is inserted in the orifice which is objectionable in that it is apt to be forced inward and prevent the flow of the flux. I provide a stopper $h$ in this end of the spout, produced by inserting it into melted rosin which hardens when cool and prevents the paste from flowing, but is easily melted by bringing the spout near the heat, and the article of manufacture is so stopped when delivered to the market.

I claim as my invention:

1. A hand implement for the application of soldering flux, comprising a collapsible receptacle for the flux provided with a reduced-outlet spout or nozzle constructed of stiff metal having an aversion for solder and less fusible than solder.

2. A hand implement for the application of soldering flux, comprising a collapsible receptacle for the flux provided with a tapering metal spout or nozzle possessing the characteristics of aversion for solder, sufficient stiffness to avoid bending when the flux is applied to position for use, and less fusibility than solder.

3. A hand implement for the application of soldering flux, comprising a collapsible receptacle for the flux provided with a metal spout or nozzle possessing the characteristics of aversion for solder, sufficient stiffness to avoid bending when the flux is applied to position for use, and less fusibility than solder, a fusible stopper being inserted in the orifice of said nozzle.

In testimony whereof, I have signed my name to this specification in the presence of two subscribing witnesses, this 20th day of November 1906.

CHARLES C. BLAKE.

Witnesses:
GEO. WILLIS PIERCE,
JAMES E. LYNCH.